United States Patent
Conner et al.

[15] 3,680,421
[45] Aug. 1, 1972

[54] BAND SAW APPARATUS

[72] Inventors: Joseph R. Conner; Thomas F. Shovlin, both of Minneapolis; Jack D. Helm, Maple Plain, all of Minn.

[73] Assignee: Bemis Company Inc., Minneapolis, Minn.

[22] Filed: July 10, 1970

[21] Appl. No.: 53,840

[52] U.S. Cl. .............................83/201.14, 143/27 R
[51] Int. Cl. ........................B23d 55/10, B27b 13/08
[58] Field of Search....83/201, 201.14; 143/27, 27 A, 143/27 B

[56] References Cited

UNITED STATES PATENTS

| | | | |
|---|---|---|---|
| 1,567,911 | 12/1925 | Campbell | 143/27 R |
| 2,958,347 | 11/1960 | Blum et al. | 143/27 A |
| 770,136 | 9/1904 | Wilkin | 143/27 A |
| 2,320,295 | 5/1943 | Patterson | 143/27 R |

Primary Examiner—Andrew R. Juhasz
Assistant Examiner—James F. Coan
Attorney—Dugger, Peterson, Johnson & Westman

[57] ABSTRACT

Band saw apparatus having a motor driven first blade mounting wheel, a second wheel, a band saw blade extended around said wheels, a plate slidably mounted on the frame mounting the second wheel for reciprocal longitudinal movement, adjustment driven screw shaft devices for varying the longitudinal position of the plate on the frame and adjustably maintaining the spacing of the end portion of the wheel mounting shafts on the opposite side of the wheels from the frame member on which the wheels are mounted, and a motor driven air operated slip clutch for driving the screw shafts to increase the spacing of the wheel mounting shafts as the blade expands during sawing and decrease the spacing after the sawing is discontinued. Bearing members are provided on both wheel mounting shafts on both sides of the wheels to prevent toeing in of the wheel mounting shafts and the wheels.

12 Claims, 4 Drawing Figures

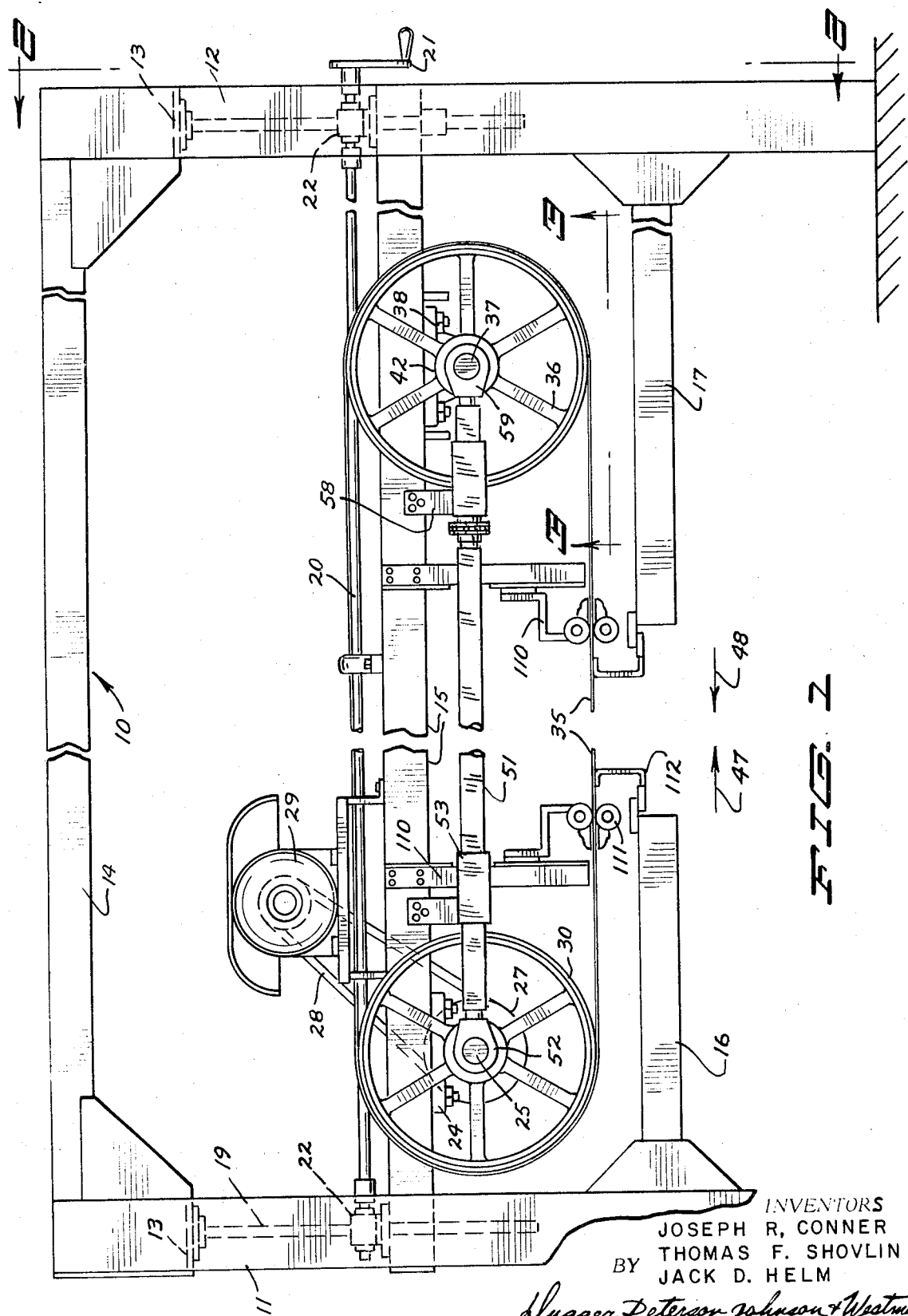

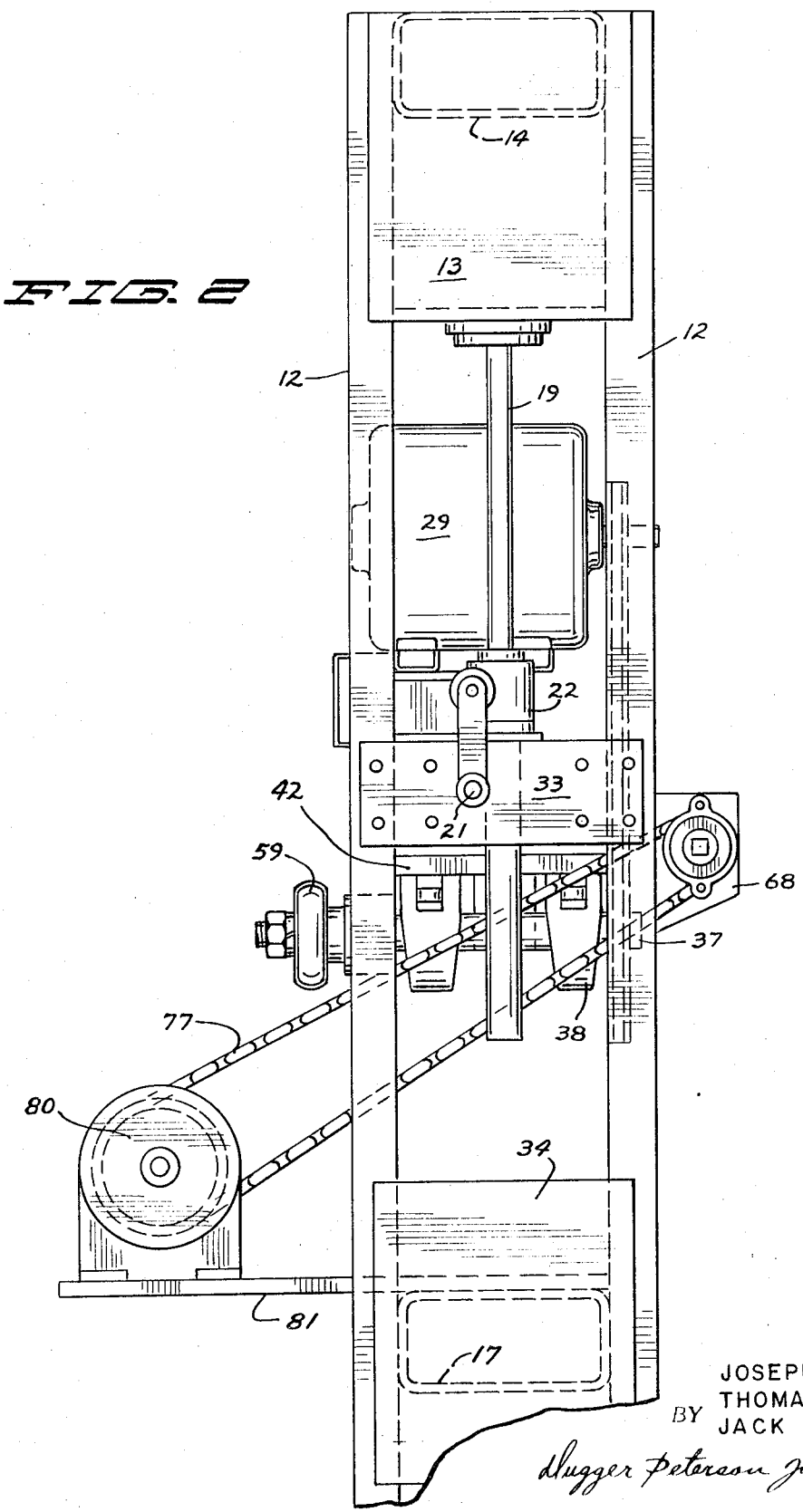

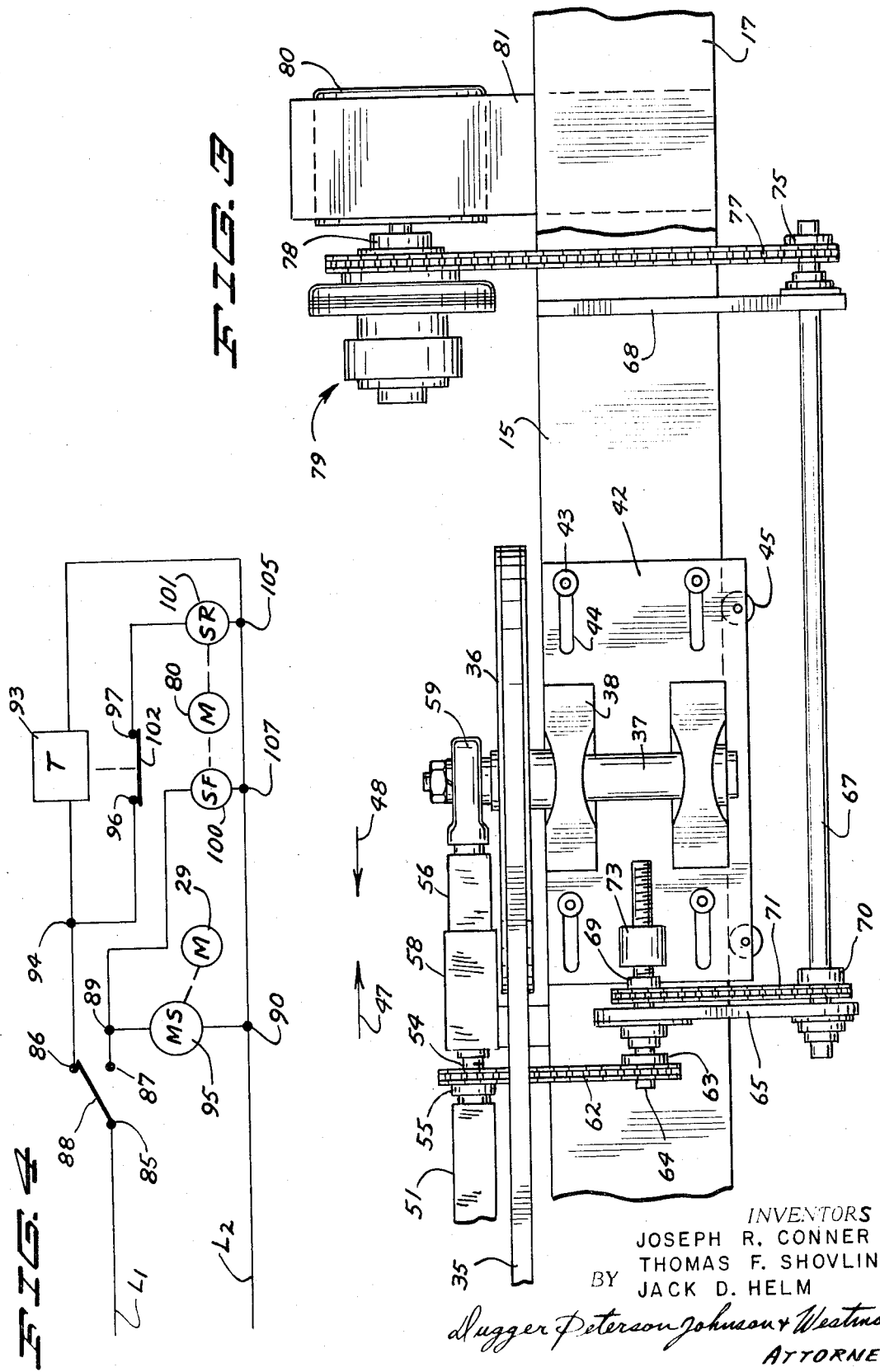

BAND SAW APPARATUS

BACKGROUND OF THE INVENTION

Band saw apparatus having a stationarily mounted rotatably blade mounting wheel, a reciprocally mounted wheel, a blade mounted by said wheels and adjustment mechanism to automatically vary the spacing of the wheels to compensate for expansion of the blade during a sawing operation.

In sawing blocks, or other objects, for example, insulating tile, to a predetermined thickness to which there is subsequently adhered a facing layer, there is a problem that if the blade is not tensioned properly, the cut surface will have a wavy surface. Further, if just before the start of the cutting operation, the blade is properly tensioned, the heat developed during the sawing operation results in the blade expanding. Providing a hand crank operated slide assembly to vary the spacing between the two blade mounting wheels, such as has been done in the prior art, leaves it to the skill of the operator as to how much the hand crank is to be turned and when to turn it to maintain the blade in proper tension. Also, if toeing in is not prevented, at times the blade comes off the wheels, and a smooth straight cut would not be obtained. In order to overcome the above mentioned problems, as well as others, this invention has been made.

SUMMARY OF THE INVENTION

Band saw apparatus that includes a frame, a motor drive first wheel mounted on the frame, a reciprocal slide assembly mounted on the frame and mounting a second wheel to move therewith, and an adjustment assembly to automatically move the slide assembly away from the first wheel as the blade expands during a sawing operation to maintain a substantial constant, preselected degree of tension in the blade.

One of the objects of this invention is to provide new and novel mechanism for automatically maintaining proper tension in the blade of a band saw as the blade heats and expands. Another object of this invention is to provide new and novel mechanism in a band saw that is mounted on the band saw blade wheel shafts and slidably mounts one of the wheel shafts to automatically translate the last mentioned shaft to take up the slack from the expansion of the blade. An additional object is to provide mechanism for mounting the blade mounting wheels for relative movement between selected spaced apart positions and preventing toeing in of the wheel mounting shafts and the wheels thereon that mount the blade.

BRIEF DESCRIPTION OF THE DRAWINGS

FIG. 1 is a side elevational view of the apparatus of this invention with portions broken away;

FIG. 2 is an end view of the apparatus of this invention, said view being generally taken along the line and in the direction of the arrow 2—2 of FIG. 1;

FIG. 3 is a fragmentary bottom view of the apparatus of this invention, the left-hand portion of the figure being generally taken along the line and in the direction of the arrow 3—3 of FIG. 1, and the right-hand portion being taken at a lower elevation; and FIG. 4 is a simplified schematic showing of the electric control circuitry.

Referring to FIGS. 1 and 2, the frame, generally designated 10, includes left-hand uprights 11; right-hand uprights 12; upper, intermediate, and lower transverse end frame members respectively 13,33,34 jointed to the respective set of uprights, a longitudinal top channel 14 extending between frame members 13; an intermediate longitudinally extending frame member 15 having one end extending between uprights 11 and an opposite end between uprights 12; a bottom longitudinally extending frame member 16 having one end mounted by uprights 11 and a bottom frame member 17 having one end mounted by the uprights 12. Both frame members 16,17 extend longitudinally and are at the same elevation; however, they have their adjacent ends spaced a substantial distance from one another.

The one ends of vertical shafts 19 are rotatably mounted by frame members 13, the shafts having lower threaded end portions forming a matching fit with the internal threads of members 22, members 22 in turn being mounted at the opposite ends of frame member 15. A drive connection 20 is provided between members 22 while a hand crank 21 is connected to the drive connection whereupon turning the hand crank, members 22 move vertically along the shafts 19 to vary the elevation of the intermediate frame member 15.

Dependingly mounted by the left-hand end portion of the frame member 15 are transversely spaced bearing mounts 24 that in turn rotatably mount a transverse shaft 25 to extend outwardly on either side of the frame member. A pulley 27 is keyed to one end of the shaft to be driven by a belt 28 which in turn is driven by a pulley keyed to the motor shaft of the motor 29. The motor 29 is mounted on the frame member 15 to extend thereabove. The opposite end of shaft 25 has a band saw wheel 30 keyed thereto, the band saw blade 35 being drivingly extended around wheel 30 and a wheel 36 that is mounted by a transverse shaft 37. The shaft 37 is rotatably mounted by a transversely spaced pair of bearing mounts 38 which in turn are dependingly mounted on a bearing mounting slide plate 42. Plate 42 has a plurality of longitudinally elongated slots 44. Bolts, mounting rollers 43 on lower ends and having their upper ends mounted by the frame member 15, have their intermediate portions extended through the slots to support the plate 42 for longitudinal movement. Also, rollers 45 are mounted on the one edge portion of plate 42 to bear against the frame member 15 to aid in guiding the movement of the plate to prevent twisting of the plate, the rollers 45 bearing against the opposite side of the channel from the wheel 36. Thus shaft 37 is mounted for limited longitudinal movement in parallel relationship to shaft 25.

One end of a longitudinally elongated rectangular tube 51 mounts a bearing member 52 in a fixed position relative thereto, bearing member 52 being mounted on shaft 25 on the opposite side of the wheel 30 from the bearing mounts 24. Tubular member 51 is slidably extended through a bracket 53 that is mounted by frame member 15, the bracket aiding in preventing the tubular member from rotating relative thereto. The opposite end of tubular member 51 rotatably mounts in a fixed axial position, a jack shaft 54 that extends longitudinally away therefrom, jack 54 having a sprocket 55 keyed to. The threaded end portion of the jack (end portion remote from tubular member 51) is threadedly extended into a rectangular tubular member 56 that has internal matching threads and is supported for longitudinal movement by a bracket 58 which is mounted by frame member 15. Bracket 58 aids in preventing rotational movement of the tube 56 while rotary movement of the jack results in the tubular member 56 being moved longitudinally. The end portion of tubular member 56 remote from sprocket 55 fixedly mounts a bearing member 59 which in turn is mounted on shaft 37 on the opposite side of wheel 36 from the bearing mounts 38. Through the above mentioned structure, upon turning the jack 54, the longitudinal spacing of shafts 25,37 is varied, and is retained in the given longitudinal spaced position until the jack is further rotated.

A chain 62 is drivingly extended over sprocket 55 and in turn is drivenly extended over sprocket 63 that is keyed to longitudinally extending shaft 64. A transversely extending bracket 65 rotatably mounts shaft 64 and also rotatably mounts the one end portion of a second shaft 67; bracket 65 being dependingly mounted by frame member 15 in a fixed position. The opposite end portion of shaft 67 is rotatably mounted by a bracket 68 that in turn is secured to frame member 15. A chain 71 is drivingly extended around a sprocket 69 that is keyed to shaft 64 and drivenly extended around a sprocket 70 keyed to shaft 67. Shaft 67 has a threaded end portion that is extended through an internally threaded block 73 which in turn is dependently secured to plate 42. As a result, upon rotation of shaft 64, block 73 is longitudinally moved along the length of the threaded portion of the shaft to move plate 42 in the corresponding direction; and tubular member 56 is moved longitudinal the same distance and in the same direction as plate 42.

A sprocket 75 is keyed to shaft 67 to be driven by a chain 77 that is extended over the sprocket of an air-operated slip clutch, generally designated 79. The air-operated slip clutch is driven at a very slow speed in appropriate direction by a reversible gear head motor 80 which is mounted by a plate 81; plate 81 being mounted by channel 17. Since clutch 79 is a conventional stock item, sold under the name "Air Champ," Model MW, by Horton Manufacturing Company of Minneapolis, Minn., its structure will not be described. Main line $L_1$ of a control circuitry is connected to a first terminal 85 of a main switch that has a second terminal 86, a third terminal 87 connected to junction 89, and a switch member 88 that remains in a position it is switched to. Main line $L_2$ is connected to a junction 90, the motor starter 95 for motor 29 being connected across junctions 89,90. A timer has a timer motor 93 that is connected across junctions 94,105; the timer also having a first terminal 96, a second terminal 97 and a normal closed switch member 102. Junction 90 is connected by a line to junctions 105 and 107. A forward starter 100 for reversing motor 80 is connected across junctions 89,107, while a reverse starter 101 is connected across junction 105 and terminal 97.

The energizing of starter 95 through appropriate circuitry (not shown) results in motor 29 being energized, while de-energizing starter 95 results in motor 29 being de-energized. Energizing starter 100 through appropriate circuitry (not shown) results in motor 80 being energized so that its shaft rotates in one angular direction while energizing starter 101 results in motor 80 being energized so that its shaft rotates in the opposite (reverse) angular direction.

Longitudinally spaced, vertical frame members 110 are dependingly secured to frame member 15 to mount rollers 111 for rotation about transverse axes to aid in retaining the intermediate portion of the lower run of the band saw blade in a horizontal condition. Further if desired, longitudinal roller (not shown) that is resiliently urged downwardly to bear against the top surface of the material being sawed may be mounted on frame members 110.

Using the apparatus of this invention, the material to be cut is supported by a conveyor (not shown) with the material extending above the elevation of the lower run of the blade intermediate channels 112 that are mounted by frame members 16,17. Switch 88 is operated to connect terminals 85,87 to energize starters 95 and 100 whereupon both motors 29 and 80 are energized. Motor 80 is energized to turn in a forward angular direction that rotates the blade tension adjusting screws 54,64 to tighten the band saw blade (move plate 42 in the direction of arrow 47). The slip clutch 79 has been adjusted by an air regulator (not shown) supplying air to the clutch such that said clutch would begin to and does slip as long as the tension in the band saw blade was above a selected value. Thus, if upon energizing motor 80, through starter 100, the blade is at or above the preselected degree of tension, the energizing of motor 80 does not result in screws 54,64 being rotated; but does result in said screws being rotated to move plate 42 and member 66 in the direction of arrow 47 upon energizing motor 80 through terminals 85,87, and thereafter, if the tension is below the selected value. However, as the band saw is used to cut material, the blade heats and accordingly expands. Due to the expansion, the tension in the band saw would start to drop and as a result screw shaft 64 would be drivenly rotated in a direction to move slide plate 42 in the direction of the arrow 47; and at the same time screw shaft 54 would be rotated to move tubular member 56 in the direction of the arrow 47 the same amount that the plate 42 is moved. This movement of plate 42 and tubular member 56 moves the shaft 37 and thereby the band saw wheel 36 to take up the slack (maintain a nearly constant tension) in the blade 35. As may be noted, the shaft 56 mounts bearing 59 on one side of wheel 36 while the plate mounts bearing members 38 on the opposite side. Likewise, bearing mounts 24 are on one side of wheel 30 while bearing 52 is on the opposite side. As a result, toeing in of the shafts and the wheels mounted therein is prevented. Such toeing in would occur if bearing members were not provided on each side of the wheels 30,36 and the bearing members mounted to maintain the wheel mounting shafts parallel; and at times, if such toeing in were permitted, the blade would come off the wheels.

When the sawing operation is to be discontinued, switch member 88 is moved to break the connection between terminals 85,87 to de-energize starters 95,100 which de-energizes motors 29,80 and to electrically connect terminals 85,86 whereby timer motor 93 is energized. The energization of timer motor 93 initially does not move switch member 102 to break the connection between terminals 96,97 but at the end of a preselected time does move switch member 102 to an open position to break the electric connection and maintain the switch member in an open position until the timer motor is de-energized. At the time the timer motor is initially energized, the reverse starter 101 is also energized whereby motor 80 is energized to run in an opposite (reverse) angular direction from that at the time the switch member 88 electrically connected terminal 85 to terminal 87. The de-energization of starters 100 and 101 respectively de-energizes the motor 80. The preselected time that starter 101 is energized is sufficient that the screw shafts 54,64 are angularly moved to move the mounting plate 42 and tubular member 56 in the direction of the arrow 48 a longitudinal dimension that loosens the blade sufficiently so that the blade will not be damaged when it cools and contracts.

Through above described structure, during the sawing operation, the blade is kept at a substantially constant tension even though it expands during the cutting operation. Also, with the aforementioned structure, merely by removing the guards (not shown) and the adjustment mechanism operated to a blade loosened condition, the blade can be readily removed. Thus, there is no requirement that any of the bearing mounts or shafts be removed in order to replace the blade. Further, by providing bearing members on each side of the wheels and the mechanism for adjustably spacing bearing mounts 38 and bearing member 59 from the corresponding bearing members on shaft 25, toeing in of the blade mounting wheels is prevented.

What is claimed is:

1. Band saw apparatus comprising a longitudinally elongated frame including a longitudinal frame member having a first end portion and a second end portion, a rotatable first wheel, a rotatably second wheel, a first shaft, a second shaft, first means for rotatably mounting the first shaft on the first end portion in a fixed longitudinal position and having an end portion extending transversely outwardly of the frame member, a slide assembly, means mounting the slide assembly on the second end portion for limited longitudinal movement, second means mounting the second shaft on the slide assembly to move longitudinally therewith and having an end portion extending transversely outwardly of the frame member in the same direction that the first shaft extends outwardly of the frame member, operable extensible means for retaining the shaft end portions spaced the same distance that the first and second means space the shafts, said extensible means having a first end portion mounted on the first shaft end portion and a second end portion mounted on the second shaft end portion, said first wheel being mounted on the first shaft transversely intermediate the frame member and the extensible means first end portion, the second wheel being mounted on the second shaft transversely intermediate the frame member and the extensible means second end portion, operable third means mounted on the frame for moving the slide assembly longitudinal, a band saw blade mounted by said wheels, means for driving one of said shafts, the wheel on the driven shaft being connected thereto to rotate therewith, and fourth means connected to the frame and to the third means and the extensible means for constantly urging the third means to move the slide assembly during the sawing operations to automatically longitudinally move the slide assembly to maintain substantially constant tension in the blade as it heats during a sawing operation and operate the extensible means to increase its longitudinal dimension substantially the same amount that the slide assembly moves.

2. The apparatus of claim 1 further characterized in that the fourth means includes a screw shaft having a threaded end portion, means for mounting the screw shaft on the frame in a fixed axial position to rotate about a longitudinal axis, and means mounted by the slide assembly to cooperate with the threaded end portion to move the slide assembly axially as the screw shaft rotates.

3. The apparatus of claim 2 further characterized in that the fourth means includes power means, said power means including means to rotate the screw shaft in a direction to move the slide assembly a limited distance longitudinally toward the first shaft upon discontinuing the sawing operation.

4. The apparatus of claim 2 further characterized in that the extensible means first end portion includes first bearing means mounted on the first shaft end portion, that the extensible means second end portion includes second bearing means mounted on the second shaft end portion and that the extensible means includes means operated by the fourth means for operating the extensible means end portions to block toeing in of the shafts first end portions.

5. Band saw apparatus comprising a longitudinally elongated frame having a first end portion and a second end portion, a shaft, a first wheel mounted on the shaft to rotate therewith, a second wheel, first means mounting the shaft on the first end portion for rotation about a first axis, a slide assembly mounted on the second end portion for reciprocal movement toward and away from the first axis, second means for rotatably mounting the second wheel on the slide assembly, a band saw blade mounted on said wheels, a motor mounted on the frame to drive said shaft, and third means mounted on the frame and drivingly connected to the slide assembly for moving the slide assembly away from the first axis to take up slack in the blade when the tension in the blade is below a preselected value during the time the motor drives said shaft, the third means including an adjustment screw, fourth means for rotatably mounting the screw on the frame, fifth means mounted on the slide assembly and cooperating with the screw to reciprocally move the slide assembly as the screw rotates, and means connected to the screw for constantly urging the screw to rotate for moving the slide assembly away from the first axis during the sawing operation and moving the fourth means to moving the slide assembly away from the first axis when the tension in the blade decreases below a preselected value.

6. In a band saw apparatus, a longitudinally elongated frame having a first end portion and a second end portion, a first wheel, a second wheel, first means mounting the first wheel on the first end portion for rotation about a first axis, a slide assembly mounted on the second end portion for reciprocal movement toward and away from the first axis, second means for rotatably mounting the second wheel on the slide assembly, a band saw blade mounted on said wheels, third means mounted on the frame to automatically move said slide assembly to take up the slack from expansion of the blade during a sawing operation, said third means including an adjustment screw, fourth means for mounting the screw on the frame in a fixed axial position for rotation about a longitudinal axis, fifth means mounted on the slide assembly and cooperating with the screw to move the slide assembly longitudinally as the screw rotates, and sixth means for drivably rotating the screw, said sixth means including a reversible motor, a clutch driven by said motor and means driven by the clutch to rotate said screw in a direction to move the slide assembly away from the first wheel axis when the blade expands to maintain a substantially constant tension in the blade, motor means for driving the first shaft and control means for actuating the motor means and the motor to operate the clutch to drive the clutch driven means for rotating the screw in one angular direction and alternately deactuate the motor means and operate the motor to operate the clutch to drive the clutch driven means for rotating the screw in the opposite angular direction.

7. Band saw apparatus comprising a longitudinally elongated frame including a longitudinal frame member having a first end portion and a second end portion, a rotatable first wheel, a rotatably second wheel, a first shaft, a second shaft, first means for rotatably mounting the first shaft on the first end portion in a fixed longitudinal position and having an end portion extending transversely outwardly of the frame member, a slide assembly, means mounting the slide assembly on the second end portion for limited longitudinal movement, second means mounting the second shaft on the slide assembly to move longitudinally therewith and having an end portion extending transversely outwardly of the frame member in the same direction that the first shaft extends outwardly of the frame member, operable extensible means for retaining the shaft end portions spaced the same distance that the first and second means space the shafts, said extensible means having a first end portion mounted on the first shaft end portion and a second end portion mounted on the second shaft end portion, said first wheel being mounted on the first shaft transversely intermediate the frame member and the extensible means first end portion, the second wheel being mounted on the second shaft transversely intermediate the frame member and the extensible means second end portion, operable third means mounted on the frame for moving the slide assembly longitudinal, a band saw blade mounted by said wheels, means for driving one of said shafts, the wheel on the driven shaft being connected thereto to rotate therewith, and fourth means connected to the frame for automatically longitudinally moving the slide assembly to maintain substantially constant tension in the blade as it heats during a sawing operation and operate the extensible means to increase its longitudinal dimension substantially the same amount that the slide assembly moves, said fourth means including a screw shaft having a threaded end portion, means for mounting the screw shaft on the frame in a fixed axial position to rotate about a longitudinal axis, means mounted by the slide assembly to cooperate with the threaded end portion to move the slide assembly axially as the screw shaft rotates, and power means for constantly urging the screw shaft to rotate in a direction to move the slide assembly longitudinally away from the first shaft during the sawing operation.

8. In a band saw apparatus, a longitudinally elongated frame having a first end portion and a second end portion, a first wheel, a second wheel, first means mounting the first wheel on the first end portion for rotation about a first axis, a slide assembly mounted on the second end portion for reciprocal movement toward and away from the first axis, second means for rotatably mounting the second wheel on the slide assembly, a band saw blade mounted on said wheels, and third means mounted on the frame to automatically move said slide assembly to take up the slack from expansion of the blade during a sawing operation, the third means including movable fourth means mounted on the frame for longitudinally moving the slide assembly, and fifth means drivingly connected to the fourth means for constantly urging the fourth means to move the slide assembly away from the first means during the sawing operation and moving the fourth means to move the slide assembly away from the first means when the tension in the blade decreases below a preselected value, said fifth means including a motor driven clutch and sixth means driven by the clutch to operate the fourth means to move the slide assembly away from the first wheel axis when the blade expands to maintain a substantially constant tension in the blade.

9. The apparatus of claim 8 further characterized in that the fourth means includes an adjustment screw, seventh means for mounting the screw on the frame in a fixed axial position for rotation about a longitudinal axis and eighth means mounted on the slide assembly and cooperating with the screw to move the slide assembly longitudinally as the screw rotates, said sixth means being connected to the screw to drivingly rotate the screw.

10. The apparatus of claim 9 further characterized in that the frame includes a longitudinal frame member, that the first and second means each includes a shaft extending transversely outwardly of the frame member and means for rotatably mounting said shafts on the frame member and slide assembly respectively, and that there is provided longitudinally extensible seventh means mounted by the shafts outwardly of the frame member for cooperating with the shaft mounting means for maintaining the shafts in spaced relationship and eighth means driven by the screw for operating said extensible means to extend the same distance that the slide assembly is moved when the screw is driven.

11. The apparatus of claim 9 further characterized in that the frame includes a longitudinally frame member having said first and second end portions, that said first means includes a first shaft, and a pair of bearing mounts mounted on the frame member first end portion for rotatably mounting the first shaft to extend transversely outwardly of the frame member, that the second means includes a second shaft, and a pair of bearing mounts mounted on said slide assembly for rotatably mounting the second shaft to extend transversely outwardly of the frame member on the same side as the first shaft, a first and a second bearing member respectfully mounted on the first and second shaft transversely outwardly of the frame member, said first and second wheels being mounted on the first and second shafts respectively intermediate the pair of bearing members and the respective one of the first and second bearing members mounted on the shaft, a longitudinal elongated rigid first tubular member having one end portion fixedly connected to the first bearing member and a second end portion, a rigid second tubular member having one end portion fixedly connected to the second bearing member and a second end portion, screw means for connecting the tubular member second end portions and moving one tubular portion longitudinally relative the other and means driven by the screw for operating the screw means to vary the longitudinal spacing of the tubular members and thereby varying the longitudinal spacing of the first and second bearing members the same amount that the slide assembly moves when the screw is driven.

12. The apparatus of claim 9 further characterized in that the first means includes a first shaft having a first, an intermediate and a second end portion and bearing means for mountingly attaching the first shaft first end portion to the frame, the first wheel being mounted on the first shaft intermediate portion, that the second means includes a first, an intermediate and a second end portion and bearing means for mountingly attaching the second shaft first end portion to the slide assembly, the second wheel being mounted on the second shaft intermediate portion, and that there is provided seventh means that is mounted by the shafts second end portions and operated by the screw for blocking toeing in of the shaft second end portions.

* * * * *